United States Patent
Gazda et al.

(10) Patent No.: US 11,379,196 B2
(45) Date of Patent: Jul. 5, 2022

(54) QUANTUM COMPUTING COMPILING

(71) Applicant: BULL SAS, Les Clayes sous Bois (FR)

(72) Inventors: Arnaud Gazda, Versailles (FR); Simon Martiel, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 21 days.

(21) Appl. No.: 17/127,233

(22) Filed: Dec. 18, 2020

(65) Prior Publication Data
US 2021/0191698 A1 Jun. 24, 2021

(30) Foreign Application Priority Data
Dec. 20, 2019 (EP) ..................................... 19306744

(51) Int. Cl.
*G06F 8/41* (2018.01)
*G06N 10/00* (2022.01)

(52) U.S. Cl.
CPC .............. *G06F 8/41* (2013.01); *G06N 10/00* (2019.01)

(58) Field of Classification Search
CPC .................................. G06F 8/41; G06N 10/00
See application file for complete search history.

(56) References Cited

U.S. PATENT DOCUMENTS

| 2019/0042965 | A1* | 2/2019 | Clarke | ..................... G06F 8/443 |
| 2019/0164076 | A1* | 5/2019 | Kim | ........................ G06N 10/00 |

FOREIGN PATENT DOCUMENTS

EP 3674998 A 7/2020

OTHER PUBLICATIONS

Itoko et al., "Quantum Circuit Compilers Using Gate Commutation Rules" (Year: 2019).*
Shi et al., "Optimized Compilation of Aggregated Instructions for Realistic Quantum Computers" (Year: 2019).*
Svore et al., "A Layered Software Architecture for Quantum Computing Design Tools" (Year: 2006).*
Kaushal "A shuttling-based trapped-ion quantum processing node" (Year: 2019).*
Lye et al., "Determining the Minimal Number of SWAP Gates for Multi-dimensional Nearest Neighbor Quantum Circuits" (Year: 2015).*
Gushu et al., "Tackling the Qubit Mapping Problem for NISQ-Era Quantum Devices," arXiv: 1809.02573v1, Sep. 7, 2018, 13 pages.
Kaushal et al., "Shuttling-Based Trapped-Ion Quantum Information Processing," arXiv: 1912.04712v1, Dec. 10, 2019, 23 pages.

(Continued)

*Primary Examiner* — Phillip H Nguyen
(74) *Attorney, Agent, or Firm* — Meagher Emanuel Laks Goldberg & Liao, LLP (57) ABSTRACT

Examples relate to a quantum computing compiling method that includes ordering quantum gates of a nearest neighbor quantum circuit in function of dependencies between the quantum gates to obtain a quantum gates hierarchical order. The hierarchical order includes a succession of front lines comprising multiple respective quantum gates of the nearest neighbor quantum circuit. The method includes successively selecting, for each front line, and following the hierarchical order, a shuttling for each respective quantum gate of the front line. The shuttling selection is, for each front line, based on a predefined constraint.

15 Claims, 7 Drawing Sheets

(56) References Cited

OTHER PUBLICATIONS

Lao et al., "Mapping of quantum circuits onto NISQ superconducting processors," arXiv: 1908.04226v1, Aug. 12, 2019, 16 pages.
Morais, "Mapping quantum algorithms in a crossbar architecture," Masters Thesis, Delft University of Technology, Sep. 25, 2019, 85 pages.
Stevens et al., "Automating quantum experiment control," *Quantum Inf Process* 16:56, 2017, 20 pages.
Bermudez, et al., "Fault-tolerant protection of near-term trapped-ion topological qubits under realistic noise sources", Phys. Rev. A 100, 062307, Quantum Physics, arXiv:1810.09199, Nov. 4, 2019.
Gutiérrez et I., "Transversality and lattice surgery: Exploring realistic routes toward coupled logical qubits with trapped-on quantum processors", Phys. Rev. A 99, 022330, Feb. 25, 2019.
Bermudez et al., "Assessing the Progress of Trapped-Ion Processors Towards Fault-Tolerant Quantum Computation", Phys. Rev. X 7, 041061, Dec. 13, 2017.
Kaufmann et al., "Fast ion swapping for quantum information processing", https://arxiv.org/pdf/1607.03734.pdf, Jul. 13, 2016.
Brandl et al., "Cryogenic setup for trapped ion quantum computing", https://arxiv.org/pdf/1607.04980.pdf, Jul. 18, 2016.
Takada et al., "Sound-driven single-electron transfer in a tunable beam-splitter setup", Nature Communications 10, 4557 (2019).

\* cited by examiner

QUANTUM COMPUTING COMPILING

BACKGROUND

While compiling a computer program may generally permit translating a computer program from a source language to a destination language, in some instances compiling permits translating a high level language such as a language understood for example by computer programmers into a lower level language which may be directly executed by a computer.

Computer program compiling has been well studied for classical computers for many years. The known computing methods however may not apply in the context of quantum computing.

SUMMARY

The invention is defined by the appended independent claims. Additional features and advantages of the concepts herein disclosed are set forth in the description which follows.

The present disclosure describes a quantum computing compiling method comprising:
  ordering quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit;
  successively selecting, for each front line, and following the hierarchical order, a shuttling for each respective quantum gate of the front line;
  whereby the shuttling selection is, for each front line, based on a predefined constraint.

In some examples, the quantum compiling method is further comprising, prior to the ordering, proceeding with SWAP insertion on a source quantum circuit in order to obtain the nearest neighbor quantum circuit.

In some examples, the constraint is a dimensional constraint.

In some examples, the dimensional constraint applies to a trapped ion quantum computer.

In some examples, the constraint comprises reducing a number of SWAPs.

In some examples, the constraint comprises reducing a total distance covered by qubits.

In some examples, the constraint comprises reducing a total number of successive states of a shuttling schedule.

In some examples, the constraint comprises reducing a number of qubit locations of a shuttling schedule.

In some examples, the shuttling comprises locations, whereby each location permits:
  swapping qubits if the location holds two qubits; and
  moving all qubits present at the location to a neighbor empty location.

In some examples, the shuttling comprises a specialized location, whereby:
  qubits may be joined into the specialized location from neighboring locations if the specialized location is empty;
  qubits may be split from the specialized location towards neighboring empty locations; and
  qubits located at the specialized location may all be submitted to a quantum gate.

In such examples comprises a specialized location, the specific location may be a laser interaction zone, LIZ. In such examples comprises a specialized location, the specific location comprises 2 qubits, whereby the 2 qubits are submitted to more than one quantum gate successively at the specific location.

In some examples, the shuttling comprises locations, whereby each location may either be empty, comprise one qubit, or comprise 2 qubits.

The present disclosure also describes a computer system comprising a processor configured to perform any one of the methods hereby disclosed.

The present disclosure also describes a computer-readable storage medium comprising instructions which, when executed by a computer, cause the computer to carry out any one of the methods hereby disclosed.

DETAILED DESCRIPTION

This disclosure relates to quantum computing. Quantum computing is a non-classical computing technology relying on the use of qubits as unit of memory. More specifically, this disclosure relates to a compiling method for quantum computing. Compiling permits translating a first representation of a computer program into a second representation. In this disclosure, compiling permits translating a higher level representation such as a quantum circuit comprising quantum gates to be applied to one or more qubits into a lower level representation. A higher level representation should be understood as being more likely to be directly understood by a human being, while a lower level representation should be understood as being more suitable for implementation onto a computing system, in this case a quantum computer. An example of such a quantum computing system is a trapped ion quantum computing system. An example of a low level representation for a trapped ion quantum computing system would describe the movement of specific ions within the trapped ion system. Such a description of movement at the system level is called a shuttling schedule. Example low level representations should take limitations of a system into account. In particular, example low level representations should take hardware limitations of a system into account. The methods according to this disclosure may also for example be applied to quantum systems based on quantum dots, whereby qubits may be physically displaced from a circuit to another, or be displaced within a same register from a location to another.

Figure 1:
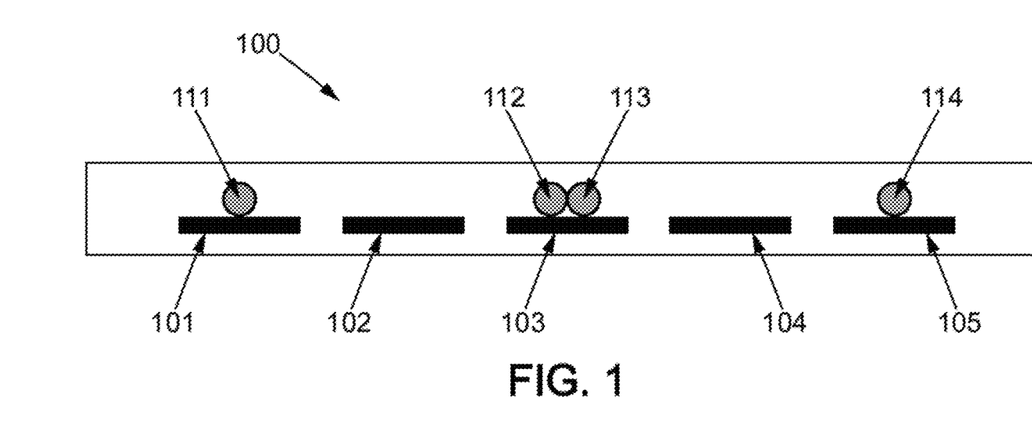
FIG. 1 is an example representation of a quantum system to which the disclosed method as per this disclosure may be applied.

An example trapped ion quantum system 100 is represented in FIG. 1. The system 100 of FIG. 1 comprises 5 locations 101-105 and 4 qubits 111-114. The system 100 is represented at a given moment, whereby locations 102 and 104 are empty, location 103 holds 2 qubits being qubits 112 and 113, and locations 101 and 105 each comprise a single qubit, respectively qubit 111 and qubit 114. Each qubit corresponds in this system to a trapped ion.

The method refers to a quantum circuit. A quantum circuit should be understood as a representation of the application of quantum gates on one or more qubits. Quantum gates are transformations applied to one of more qubits. In other words, quantum gates are basic quantum circuit operation. Example of quantum gates comprise Hadamar gates, SWAP gates, CNOT gates, Controlled-Z gates or Pauli gates.

Figure 2:
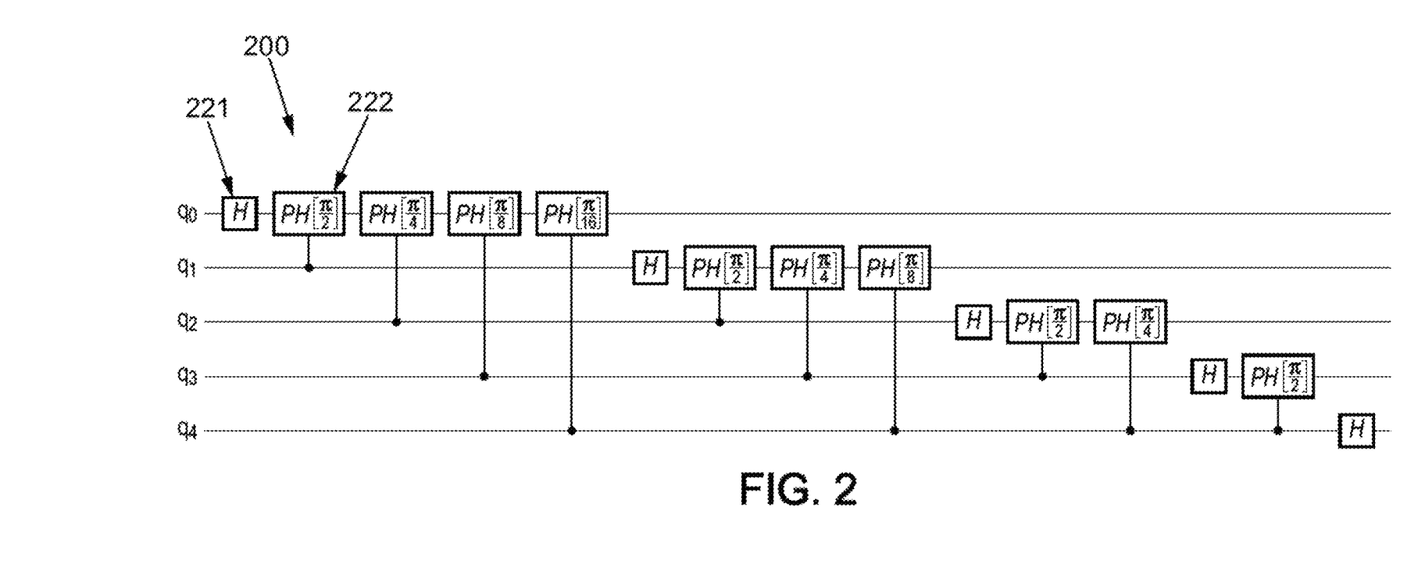
FIG. 2 is an example representation of a quantum circuit to which the disclosed method as per this disclosure may be applied.

In some representations of quantum circuits, qubits are represented along different lines, each line representing one qubit. A quantum gate operating on a qubit is placed onto the line corresponding to the qubit. In some cases, a quantum gate involves more than one qubit, in which case such quantum gate may not only be placed on the line corresponding to one of such qubits, be will also be linked by a segment to another line corresponding to another of such qubit to which the quantum gat will be applied. An example quantum circuit 200 is represented on FIG. 2. Quantum circuit 200 is a representation comprising 5 different qubits q0-q4, each represented by a line, in this case a horizontal line. Each qubit may be represented as being submitted to a quantum gate, time flowing from left to right in FIG. 2. Quantum gates are represented by rectangles placed onto the line corresponding to a qubit to which they are applied. In FIG. 2, the first quantum gate 210 represented on the far left is a Hadamar gate "H" applied to qubit q0. The following gate 222 is a Controlled-Phase gate of angle pi/2 gate applying to qubit q0 after application of the first Hadamar gate, and to qubit q1, to which such following gate 222 is also linked, in this case by a vertical segment. It should be noted that quantum gate 222 requires completing quantum gate 221 in order to take place. In other words, quantum gate 222 is dependent on quantum gate 221.

In order to apply a given gate such as gates represented in FIG. 2 to one or more qubits in a system as represented in FIG. 1, such qubits should in such examples be in the same location. In other words, quantum gate 22 may be applied to the qubits 112 and 113 located in location 103. Taking this into account, one realizes that applying to a given quantum computing system a given quantum circuit may be a complex operation, whereby qubits may have to be moved from one location to another a number of times. This is rendered even more complex when additional limitations, such as hardware limitations, exist.

Figures 3, 4:
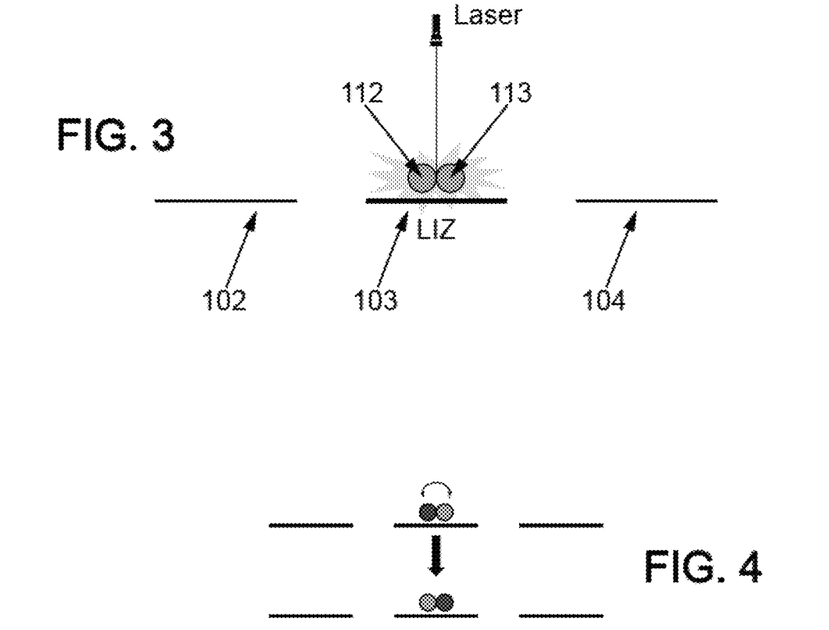
FIG. 3 is an example representation of a quantum system to which the disclosed method as per this disclosure may be applied.
FIG. 4 is an example representation of a quantum system to which the disclosed method as per this disclosure may be applied.
Figure 5:
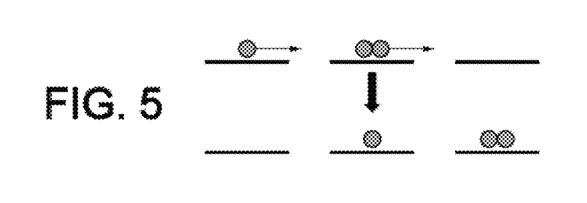
FIG. 5 is an example representation of a quantum system to which the disclosed method as per this disclosure may be applied.
Figure 6:
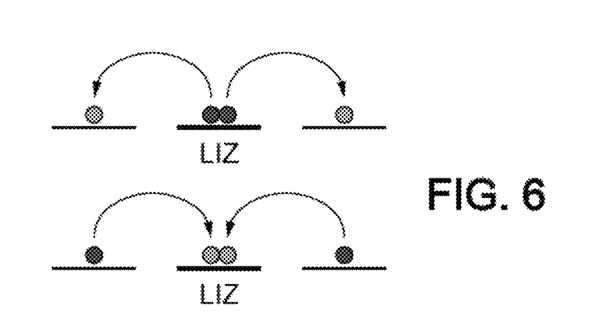
FIG. 6 is an example representation of a quantum system to which the disclosed method as per this disclosure may be applied.

An example of hardware limitation is that in some quantum computing hardware systems, only some specific locations may permit executing some specific quantum gates. In an example, a location such as location 103 is a Laser Interaction Zone or LIZ as illustrated in FIG. 3 whereas the other locations 101, 102, 104 and 105 are different locations which do not permit interaction with a laser. As a consequence, in such a system, while any location may permit swapping qubits as illustrated in FIG. 4, or moving all qubits present at one location to a neighbor location as illustrated in FIG. 5, only specific location such as LIZ location may permit splitting two qubits placed in the LIZ into two neighboring locations, or uniting two qubits into a LIZ location from two neighboring locations. In other words, in some examples a shuttling may comprise locations, whereby each location permits swapping qubits if the location holds two qubits as per FIG. 4 for example; and/or moving all qubits present at the location to a neighbor empty location as per FIG. 5 for example. In the same or other examples, the shuttling comprises a specialized location, whereby qubits may be joined into the specialized location from neighboring locations if the specialized location is empty as per the bottom part of FIG. 6 for example; whereby qubits may be split from the specialized location towards neighboring empty locations as per the top part of FIG. 6 for example; and whereby qubits located at the specialized location may all be submitted to a quantum gate. Such specific location may be a laser interaction zone, LIZ. In some examples, the specific location comprises 2 qubits, and whereby the 2 qubits are submitted to more than one quantum gate successively at the specific location, for example in order to limit the movement of qubits while proceeding with the execution of a shuttling.

In some examples, the shuttling comprises locations, whereby each location may either be empty, comprise one qubit, or comprise 2 qubits. In some example, the shuttling comprises locations, whereby none of the locations of the shuttling may comprise at a give moment 3 qubits or more.

Such example limitations render the compiling particularly complex. It is an objective of the method according to this disclosure to solve issues related to such a complex compiling process.

The method according to this disclosure comprises ordering quantum gates of a nearest neighbor quantum circuit. A nearest neighbor quantum circuit is a quantum circuit for which gates operate on nearest neighbors. A nearest neighbor quantum circuit may be provided as such, or may be produced based on a quantum circuit which applies quantum gates to qubits which may not be nearest neighbors. If a quantum circuit is provided in order to proceed with a method according to this disclosure is not a nearest neighbor quantum circuit, the method may comprise, prior to the ordering, proceeding with SWAP insertion on a source quantum circuit in order to obtain the nearest neighbor quantum circuit. SWAP insertion may for example comprise inserting one or more SWAP quantum gates permitting approximating a qubit to another qubit in order to turn a quantum circuit which comprises quantum gates applied to qubits which are not nearest neighbors into an equivalent nearest neighbor quantum circuit. An equivalent quantum circuit is a quantum circuit which will provide the same final results as a given original quantum circuit. The quantum circuit illustrated in FIG. 2 comprises quantum gates which applies to qubits which are not nearest neighbors. This is assuming that in FIG. 2, q0 has only one nearest neighbor which is q1, q1 has two nearest neighbors being q0 and q2, q2 has two nearest neighbors being q1 and q3, etc. . . . )

Figure 7:
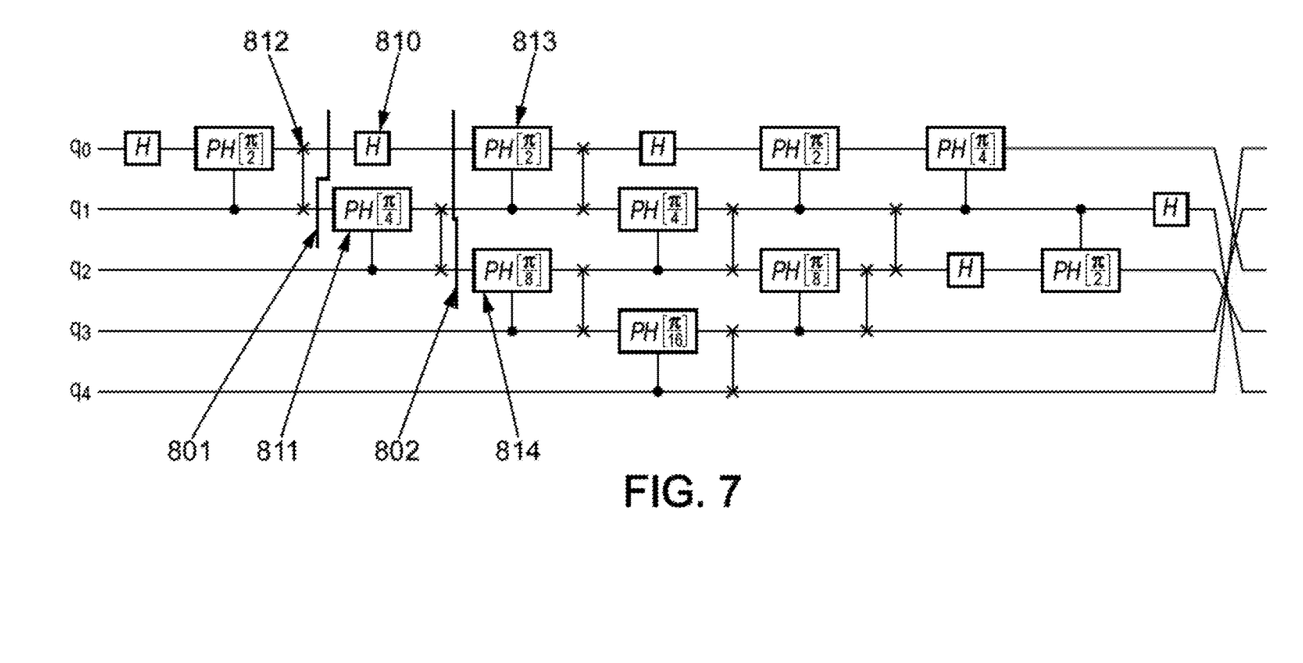
FIG. 7 is an example representation of a quantum circuit to which the disclosed method as per this disclosure may be applied.

An example of nearest neighbor quantum circuit is illustrated in FIG. 7. As illustrated in FIG. 7, the various quantum gates comprised in the quantum circuit are applied to nearest neighbor qubits. In fact, the neighbor quantum circuit is illustrated in FIG. 7 is equivalent to the quantum circuit of FIG. 2, whereby qubits have been swapped to form an equivalent nearest neighbor quantum circuit.

Figure 8:
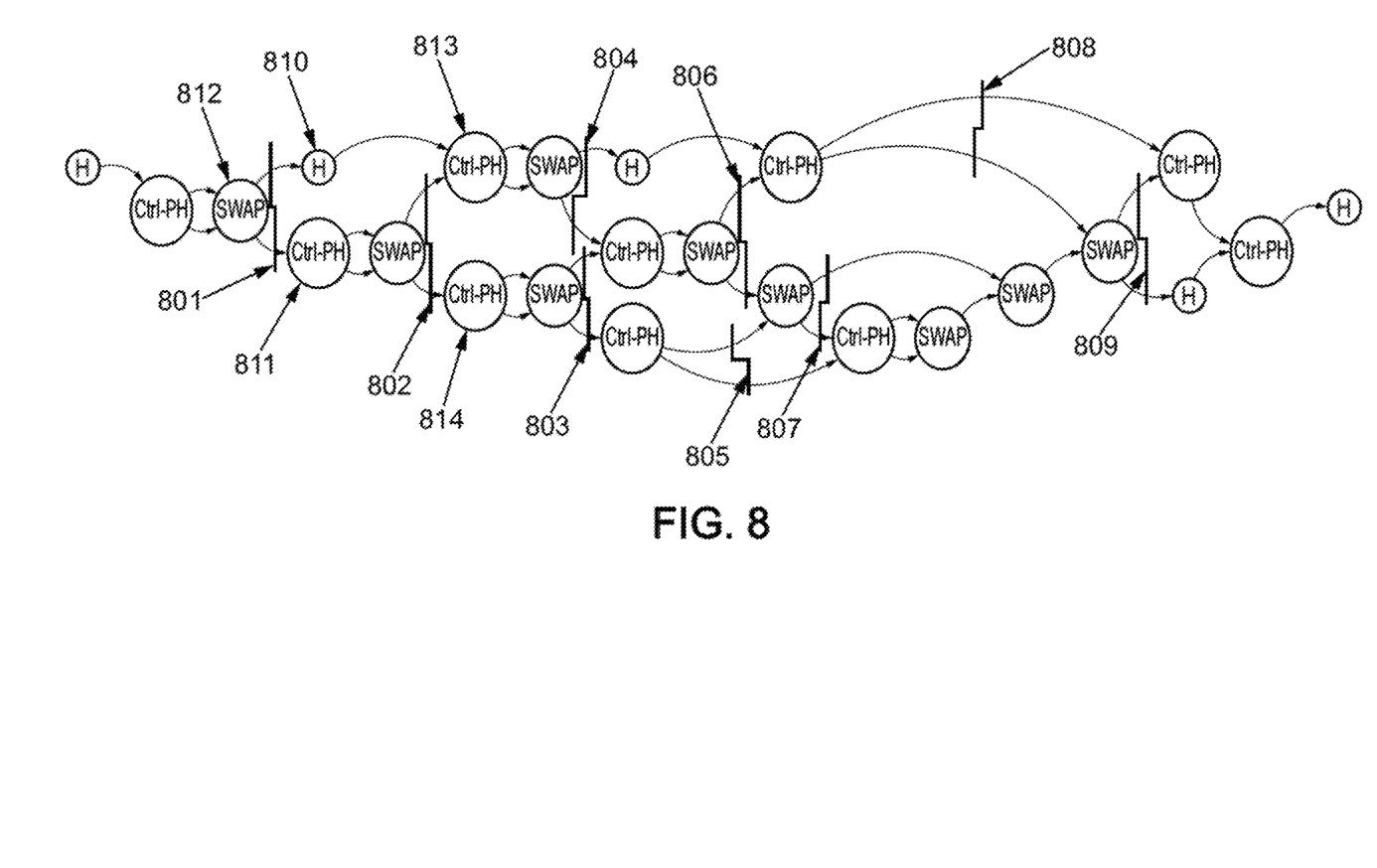
FIG. 8 is an example of a representation of the quantum circuit of FIG. 7.

The method according to this disclosure comprises ordering quantum gates of a nearest neighbor quantum circuit in function of dependencies between the quantum gates. Ordering the quantum gates in function of dependencies implies that for example quantum gate 222 of FIG. 2 would come after quantum gate 221 of FIG. 2, because a given quantum gate which should be applied to a qubit to which a previous quantum gate was applied would be placed after such previous quantum gate. FIG. 8 illustrates an example of a representation of the dependencies between quantum gates based on the nearest neighbor quantum circuit of FIG. 7, in the form of a PERT (Program Evaluation Review Technique) diagram.

The method according to this disclosure comprises ordering quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit. The hierarchical order should be understood as an order to proceed with operating quantum gates when taking dependencies into account. While such a hierarchical order could in very simple cases, form a linear hierarchical order without branching, in most cases the hierarchical order with comprise branching, the branching leading to the possibility to choose between different gates. Such stages in the hierarchical order comprising different choices as to executing a next gate correspond to a front line. Front lines 801-809 comprising multiple respective quantum gates of the nearest quantum circuit are represented in FIG. 8.

Figure 9A:
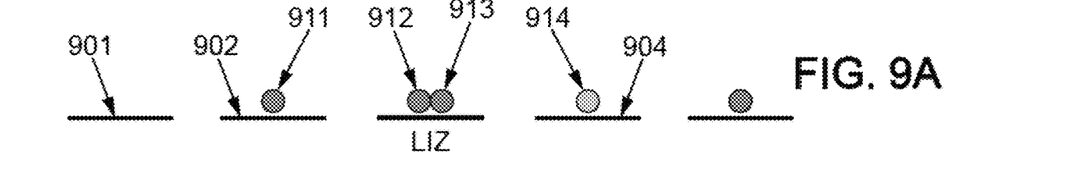
FIGS. 9A-J are example representation of a quantum system to which the disclosed method as per this disclosure may be applied.
Figure 9B:
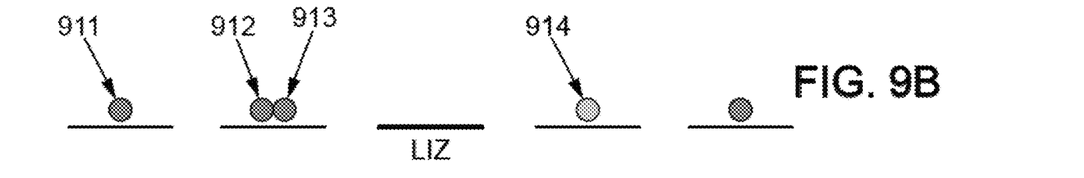
Figure 9C:
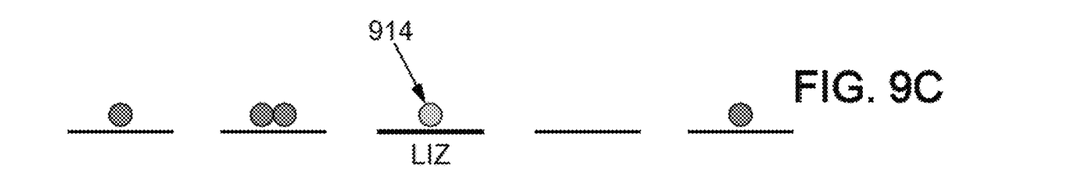

The method according to this disclosure comprises successively selecting, for each front line, and following the hierarchical order, a shuttling for each respective quantum gate of the front line. An example of shuttling is illustrated in FIGS. 9A-C. 9A represents a starting point illustrating the positioning of 5 qubits in a quantum system comprising 5 locations, the central location being, in this example, a LIZ location. In this example, let us assume that the qubit represented by trapped ion 914 located in location 904 should be displaced to the LIZ in order to be submitted to a quantum gate which may only take place in the LIZ location. The shuttling will in this example involve, in a first step, liberating the LIZ by moving qubits 911 from location 902 to location 901 and qubits 912 and 913 from the LIZ location to location 902. This first step will lead to the situation described in FIG. 9B. In a second step, leading to FIG. 9C, the qubit 914 will be moved into the LIZ in order to be submitted to the quantum gate concerned.

Figure 9D:
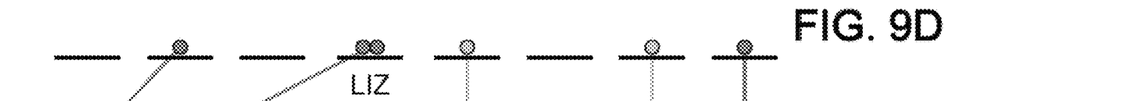
Figure 9E:
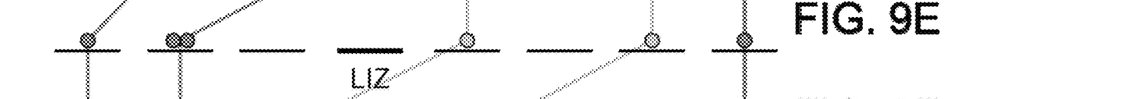
Figure 9F:
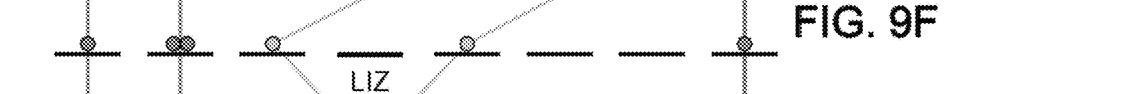
Figure 9G:
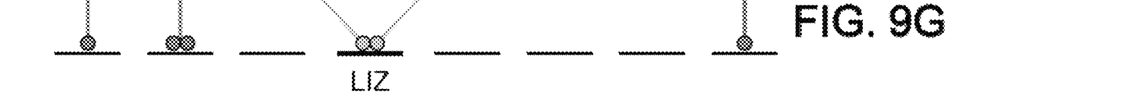

Another example of shuttling is illustrated in Figured 9D to 9G, whereby two qubits which originally were away from the LIZ in FIG. 9D are moved progressively into the LIZ in FIG. 9G. This is done by, from FIG. 9D to FIG. 9E, moving away 2 qubits present in the LIZ, then translating the two qubits which originally were away from the LIZ in FIG. 9D so they surround the empty LIZ in order to, between FIG. 9F and FIG. 9G, join them into the LIZ. In this example, qubits should be isolated as single qubits in opposite neighboring location of the empty LIZ to be brought together into the LIZ. If successive quantum gates may be applied to 2 qubits located in a LIZ, such qubits may be maintained in the LIZ.

Figure 9H:
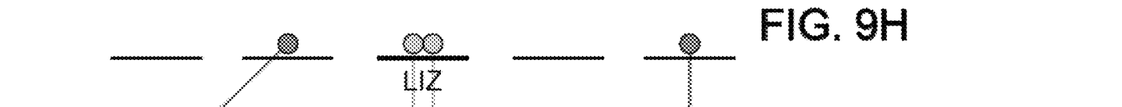
Figure 9I:
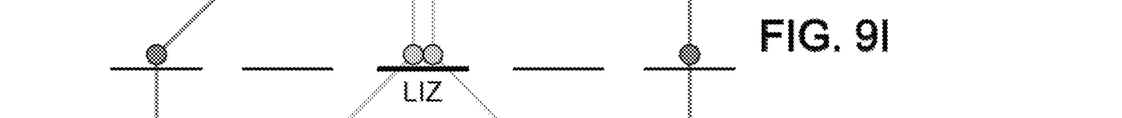
Figure 9J:
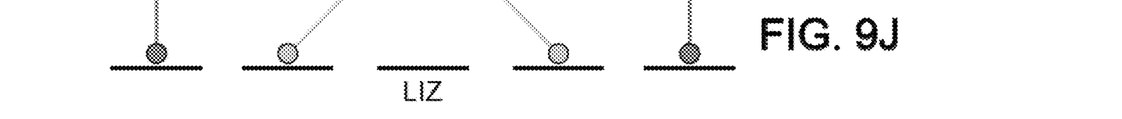

A further example of shuttling is illustrated in Figured 9D to 9G, whereby 2 qubits originally together in a LIZ as per FIG. 9H are split away from the LIZ in FIG. 9I, whereby such splitting away takes place after emptying the locations being neighbor to the LIZ, in order to proceed with the split. Indeed, in such examples, a qubit may not be placed in a location which is not an empty location.

As mentioned above, a shuttling is selected for each respective quantum gate of the front line. Because each front line comprises multiple respective quantum gates, a choice should be made. Indeed, according to the method hereby described, the shuttling selection is, for each front line, based on a predefined constraint. Such predefined constraint permits selecting in which order of quantum gate shuttling should be built for a given front line. It is indeed an objective of the method according to this disclosure to determine a specific path to build a shuttling corresponding to a quantum circuit when numerous paths are otherwise available.

In other words, if a user is provided with a quantum circuit C and with hardware H corresponding to a quantum computing system, numerous shuttling or shuttling schedule possibilities may exist to implement the quantum circuit using the quantum computing system. If a set $\mathcal{S}_C(H)$ of all possible shuttling schedules is defined which are equivalent to circuit C taking into account the characteristics or limitations of hardware H, an example resolution of the technical problem may be formulated as solving:

$$\underset{T \in \mathcal{S}_C(H)}{\mathrm{argmax}} f(T)$$

where function $f$ is a function from $\mathcal{S}_C(H)$ towards $\mathbb{R}$. Finding a shuttling schedule close to a global optimal point will be permitted by the method according to the description.

In some examples, the constraint is a dimensional constraint. Using a dimensional constraint may permit taking dimensional limitations of a quantum computing system into account. Dimensional limitations may for example comprise a maximum number of locations. Different quantum systems may have different dimensional constraints. In some examples, the dimensional constraint applies to a trapped ion quantum computer. Example of dimensional constraints which may apply to a trapped ion quantum computer comprises a limited number of locations and a limited number of qubits.

In some examples, the constraint comprises reducing a number of SWAPs. Reducing a number of SWPAs may permit gaining time when proceeding with the execution of a quantum program. Reducing a number of SWAPs should be understood as reducing the number of time where two qubits located on a same location are swapped.

In some examples, the constraint comprises reducing a total distance covered by qubits. Again in this case, an advantage of reducing such distance may lead to a gain of time when executing a compiled quantum program by way of a shuttling according to the methods hereby disclosed. The total distance may be calculated by cumulatively adding all the movements of all the qubits required to complete the execution of a shuttling. In the example of FIGS. 9A to 9C, the total distance would be the sum of the distance covered by the qubits which are being moved, i.e. qubits 911, 912, 913 and 914. If one would count a move of one qubit from one location to a neighbor location as 1, the distance covered by qubit 914 is 1 (a move from location 904 to the LIZ), the distance covered by qubit 911 is 1 (a move from location 902 to location 901) and each of 912 and 913 would also move of 1 (from the LIZ location to location 902). In FIGS. 9A to 9C, the total distance covered by qubits would thereby be of 4. In this example, applying a SWAP gate as illustrated in FIG. 4 would count 0 (zero) as distance. In other words, applying a SWAP gate would not contribute to a total distance calculation.

In some examples, the constraint comprises reducing a total number of successive states of a shuttling schedule, again aiming at reducing the time taken to execute a shuttling schedule. In the example of FIGS. 9A to 9C, the shuttling schedule comprises 3 states, corresponding to the state of FIG. 9A, the state of FIG. 9B and the state of FIG. 9C. Passing from one state of a shuttling schedule to another may take place in one operation. Operations comprises applying a quantum gate, displacing qubits as a group from one location to a neighbor location in a same direction, even if the qubits pertaining to the group are located on different location (such as qubits 911, 912 and 913 moved as a group between FIG. 9A and FIG. 9B), splitting 2 qubits located together on a specialized location to move them onto neighbor locations in opposite directions as per the top part of FIG. 6, or joining into a same specialized location 2 qubits which were single qubits on opposite neighbor locations of the specialized location as per the bottom part of FIG. 6.

One should note that the predefined constraint may comprise a plurality of sub constraints, for example following a rule or priorities. For example, a constraint may comprise a main priority reducing a number of SWAPS, followed by a second priority of reducing a total distance covered by qubits. Following such a predefined constraint permits selecting which quantum gate may be selected for building a shuttling schedule.

Figure 13:
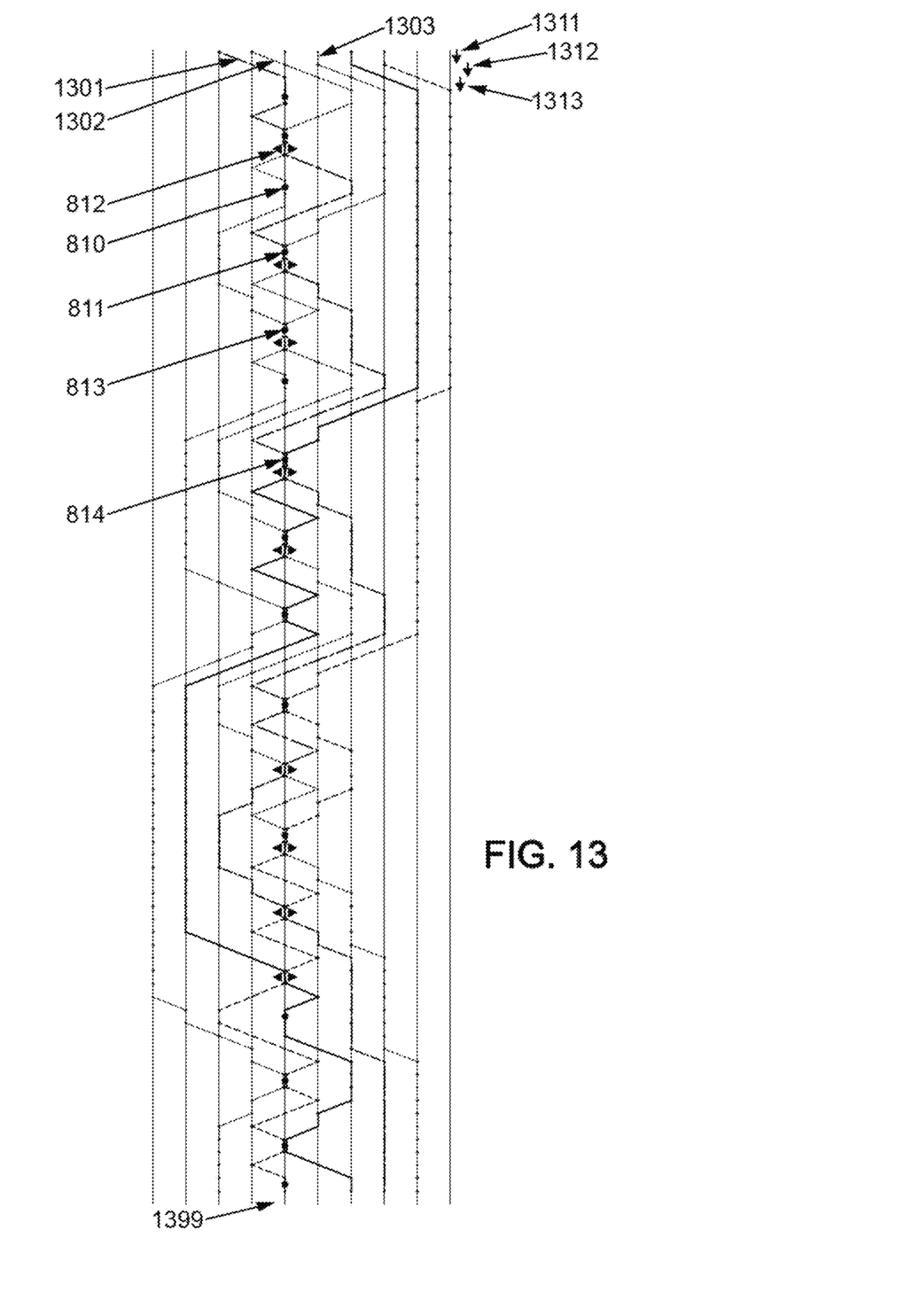
FIG. 13 is an example representation of a shuttling schedule obtained by a method as per this disclosure.

In the example PERT diagram illustrated in FIG. 8 (used in this example by a method according to this disclosure to obtain the shuttling schedule illustrated on FIG. 13), the constraint or metric used was to minimize or reduce the total distance. For each front line of the FIG. 8, a choice was made according to this constraint. If for example a first qubit is relatively far from the LIZ compared to a second qubit, moving the first qubit to the LIZ is costly (i.e. it increases the total distance). The method should in this case therefore lead to applying the gate acting on qubits closer to the LIZ (since the constraint or metric is to minimize or reduce the total distance.

In the case of front line 801: This front line 801 placed after applying SWAP gate 812 represented on FIGS. 7, 8 and 13, is used to decide whether the H gate 810 (acting on qubit 1 as per FIG. 7 corresponding to the trajectory 1301 in FIG. 13) or the Ctrl-PH gate 811 (acting on qubits 0 and 2 as per FIG. 7) is applied. Since the qubit 2 (as per FIG. 7, corresponding to the trajectory 1303 in FIG. 13) is far from the LIZ (positioned in FIG. 13 at position 1399) as indicated by the partial shuttling schedule (the schedule represented in FIG. 13 is progressively built, top to bottom, through the methods hereby disclosed—the decision point represented by front line 801 being placed directly below applying the SWAP gate 812 in FIG. 13), applying the Ctrl-PH gate would significantly increase a lot the total distance. The H gate 810 is therefore applied instead to qubit 1 or qo in FIG. 7. In FIG. 7, read from left to right, the qubit q0 is first submitted to a H gate, then to a Ctrl-PH(PI/2) gate together with q1, then swapped with q1 as illustrated by 812. As illustrated in FIG. 13, read from top to bottom, the resulting shuttling schedule proceeds with gate 810 prior to proceeding with gate 811.

In the case of front line 802, this front line is used to decide whether the phase 1 illustrated by 813 (Ctrl-PH acting on qubits 1 and 2) or the phase 2 illustrated by 814 (Ctrl-PH acting on qubits 0 and 3) is applied. Since no gate has been applied on the qubit 3 when this front line 802 is met, the qubit 3 happens to have been moved away from the LIZ (the LIZ being a high interaction zone, if a qubit is unused, this qubit will be likely have been moved away from the LIZ during earlier steps). Applying first the gate 814 phase 2 would therefore relatively increase the total distance of the partial schedule and phase 1 corresponding to 813 is applied instead, as illustrated in FIG. 13.

In some examples whereby, prior to the ordering, the method comprises proceeding with SWAP insertion on a source quantum circuit in order to obtain the nearest neighbor quantum circuit, the predefined constraint is also taken into account to proceed with SWAP insertion.

Figures 10, 11:
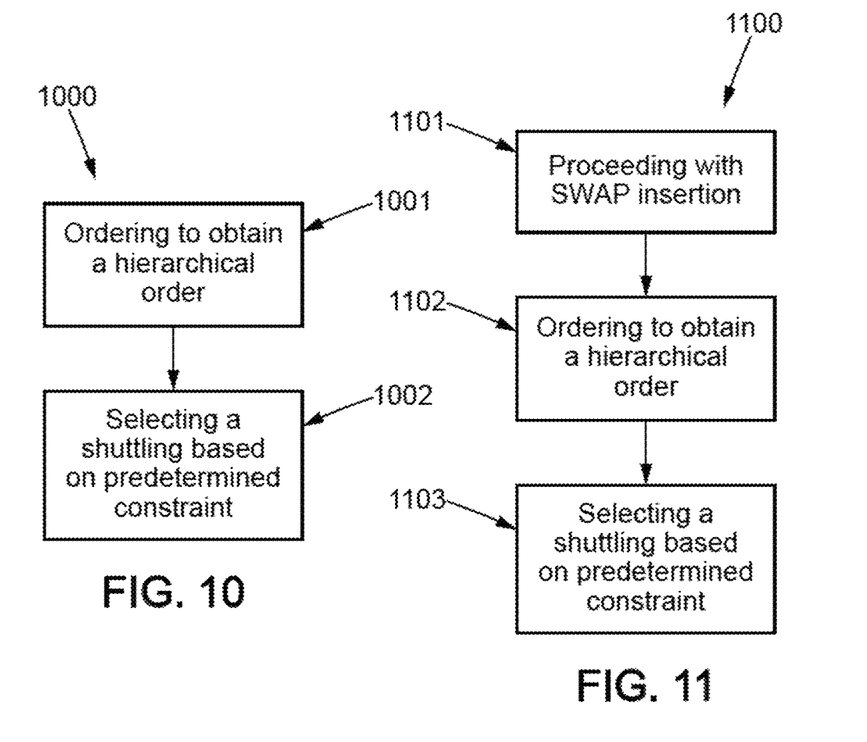
FIG. 10 is an example representation of a method as per this disclosure.
FIG. 11 is an example representation of a method as per this disclosure.

An example quantum computing compiling method 1100 according to this disclosure is illustrated in FIG. 11. In this example, block 1001 comprises ordering quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit. In this example, block 1002 comprises successively selecting, for each front line, and following the hierarchical order, a shuttling for each respective quantum gate of the front line. In this example, the shuttling selection is, for each front line, based on a predefined constraint.

Another example quantum computing compiling method 1100 according to this disclosure is illustrated in FIG. 11. In this example, block 1101 comprises proceeding with SWAP insertion on a source quantum circuit in order to obtain the nearest neighbor quantum circuit prior to ordering, in block 1102, quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit. In this example, block 1103 comprises successively selecting, for each front line, and following the hierarchical order, a shuttling for each respective quantum gate of the front line. In this example, the shuttling selection is, for each front line, based on a predefined constraint.

Figure 12:
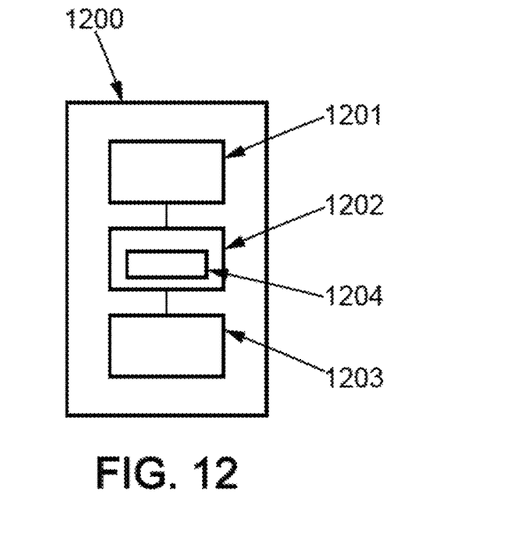
FIG. 12 is an example representation of an example computer system as per this disclosure.

FIG. 12 illustrates an example computer system 1200 comprising a processor 1201, a memory 1202 and a networking module 1203, the processor 1201 being configured to operate according to any of the methods hereby described. Processor 1201 may comprise electronic circuits for computation managed by an operating system.

FIG. 12 also illustrates a non-transitory machine-readable or computer readable storage medium, such as, for example, memory or storage unit 1202, whereby the non-transitory machine-readable storage medium is encoded with instructions 1204 executable by a processor such as processor 1201, the machine-readable storage medium comprising instructions 1204 to operate processor 1201 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

In an example, the shuttling schedule illustrated in FIG. 13 is obtained by applying the method according to this disclosure to the quantum circuit illustrated in FIG. 7 using the hierarchy illustrated in FIG. 8. The shuttling illustrated in FIG. 13 was compiled in 0.0075 seconds using a single thread of a Xeon E7 Intel processor. In this example, 5 different qubits are being used, the movement of each qubit being reproduced by a line running from the top to the bottom of the shuttling schedule, the line following the trajectory of the qubit. The line 1301 illustrates the trajectory of qubit q0, for example. The line 1302 illustrates the trajectory of qubit q1. The line 1303 illustrates the trajectory of qubit q2. In the first step 1311, qubit q0 and qubit q1 are moved together from their location to a neighbor location in the same direction represented on the right hand side. The other 3 qubits remain at their original location in the first step 1311. In the second step 1312, all 5 qubits are moved to a neighbor location in the same direction. At the end of the step 1312, qubit q0 is located in a specialized location 1399, in this case a LIZ. The locations are in FIG. 13 represented by vertical lines. In step 1313, all qubits except q0 are moved away from the LIZ, for example to provide sufficient room for further movements to take place later on. In the following step, q0 is submitted to a quantum gate in the LIZ, the quantum gate being represented by a black pentagon. The following steps are represented using the same conventions, the double triangle representing a SWAP quantum gate.

The invention claimed is:

1. A quantum computing compiling method, comprising:
    ordering quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit; and
    successively selecting, for each front line, and following the hierarchical order, a shuttling for each respective quantum gate of the front line,
    wherein the shuttling selection is, for each front line, based on a predefined constraint.

2. A quantum computing compiling method according to claim 1 further comprising:
    prior to the ordering, proceeding with SWAP insertion on a source quantum circuit in order to obtain the nearest neighbor quantum circuit.

3. A quantum computing compiling method according to claim 1, wherein the constraint is a dimensional constraint.

4. A quantum computing compiling method according to claim 3, wherein the dimensional constraint applies to a trapped ion quantum computer.

5. A quantum computing compiling method according to claim 1, wherein the constraint comprises reducing a number of SWAPs.

6. A quantum computing compiling method according to claim 1, wherein the constraint comprises reducing a total distance covered by qubits.

7. A quantum computing compiling method according to claim 1, wherein the constraint comprises reducing a total number of successive states of a shuttling schedule.

8. A quantum computing compiling method according to claim 1, wherein the constraint comprises reducing a number of qubit locations of a shuttling schedule.

9. A quantum computing compiling method according to claim 1, wherein the shuttling comprises locations, wherein each location permits:
    swapping qubits if the location holds two qubits; and
    moving all qubits present at the location to a neighbor empty location.

10. A quantum computing compiling method according to claim 1, wherein the shuttling comprises a specialized location, wherein:
    qubits may be joined into the specialized location from neighboring locations if the specialized location is empty;
    qubits may be split from the specialized location towards neighboring empty locations; and
    qubits located at the specialized location may all be submitted to a quantum gate.

11. A quantum computing compiling method according to claim 10, wherein the specific location is a laser interaction zone, LIZ.

12. A quantum computing compiling method according to claim 10, wherein the specific location comprises two qubits, and wherein the two qubits are submitted to more than one quantum gate successively at the specific location.

13. A quantum computing compiling method according to claim 1, wherein the shuttling comprises locations, wherein each location may either be empty, comprise one qubit, or comprise two qubits.

14. A computer system comprising a processor, a storage coupled to the processor and an instruction set to cooperate with the processor and the storage, the processor configured to:
    order quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit; and
    successively select, for each front line, and following the hierarchical order, a shuttling for each respective quantum gate of the front line, wherein the shuttling selection is, for each front line, based on a predefined constraint.

15. A non-transitory machine-readable storage medium executable by a processor, the machine-readable storage medium comprising:
    instructions to order quantum gates of a nearest neighbor quantum circuit in function of dependencies between the quantum gates to obtain a quantum gates hierarchical order, the hierarchical order comprising a succession of front lines comprising multiple respective quantum gates of the nearest neighbor quantum circuit; and
    instructions to successively select, for each front line, and following the hierarchical order, a shuttling for each respective quantum gate of the front line, wherein the shuttling selection is, for each front line, based on a predefined constraint.

* * * * *